United States Patent [19]

Waddill

[11] 4,179,418

[45] * Dec. 18, 1979

[54] WATER-BASED EPOXY RESIN COATING COMPOSITION

[75] Inventor: Harold G. Waddill, Austin, Tex.

[73] Assignee: Texaco Development Corp., White Plains, N.Y.

[ * ] Notice: The portion of the term of this patent subsequent to Sep. 11, 1996, has been disclaimed.

[21] Appl. No.: 884,077

[22] Filed: Mar. 6, 1978

Related U.S. Application Data

[63] Continuation-in-part of Ser. No. 865,050, Dec. 27, 1977.

[51] Int. Cl.$^2$ .............................................. C08L 63/02
[52] U.S. Cl. ........................... 260/18 PN; 260/18 N; 260/29.2 EP
[58] Field of Search ......... 260/18 N, 18 PN, 29.2 EP

[56] References Cited

U.S. PATENT DOCUMENTS

| | | | |
|---|---|---|---|
| 3,792,002 | 2/1974 | Krieger et al. | 260/18 N |
| 3,882,090 | 5/1975 | Fagerburg et al. | 260/18 N |
| 3,956,208 | 5/1976 | Hoki et al. | 260/18 PN |
| 3,998,771 | 12/1976 | Feneis, Jr. et al. | 260/18 N |
| 4,024,116 | 5/1977 | Horn et al. | 260/18 N |

*Primary Examiner*—Ronald W. Griffin
*Attorney, Agent, or Firm*—Carl G. Ries; Thomas H. Whaley; Kenneth R. Priem

[57] ABSTRACT

A water based epoxy resin is disclosed. The epoxy resin is useful in protective coatings. It should have little or no utility in casting, encapsulating, etc. applications because of difficulty in removal of solvent, i.e., water. The cured epoxy resin is made by curing an epoxy resin of the polyhydric phenol, polyglycidyl ether type by combining the resin with a reactive water-compatible polyamide in an aqueous medium. The polyamide is prepared from fatty acids and an aminopropyl derivative of a polyoxyalkylenepolyamine.

8 Claims, No Drawings

WATER-BASED EPOXY RESIN COATING COMPOSITION

This application is a Continuation-In-Part of application Ser. No. 865,050 filed Dec. 27, 1977.

BACKGROUND OF THE INVENTION

This invention relates to the field of water based epoxy resins. Prior art water based epoxy resins known to applicant generally utilize an emulsion and an organic solvent in their formulation. The presence of organic solvent provided a problem because of volatile solvents escaping into the atmosphere. Therefore, those skilled in the art have sought to provide a water based epoxy resin which would be free of the difficulties of using large amounts of organic solvents. In U.S. Pat. No. 3,998,771 a process is disclosed whereby a carboxylic acid is reacted with a primary amine to form an amide. This amide was then reacted in excess with an epoxy resin and the product was water dispeersed and further reacted with enough epoxy resin to stoichiometrically cure the resin. I have found that the initial step of reacting an amide with an epoxy resin before further reaction can be eliminated and an amide formed which will react directly with the entire amount of epoxy resin to form a cured product in one step.

SUMMARY OF THE INVENTION

The invention is a water based curable epoxy resin and the resulting cured resin. The cured resin may be made by curing an epoxy resin of the polyhydric phenol, polyglycidyl ether type by mixing with a reactive water compatible polyamide prepared from fatty acids (or derivatives of fatty acids) and an aminopropyl derivative of a polyoxyalkylenepolyamine in an aqueous medium.

DESCRIPTION OF THE PREFERRED EMBODIMENTS

The water compatible amide useful in the process of my invention is formed by the reaction of a fatty acid (or derivatives of fatty acids) and a polyoxyalkylenepolyamine of such type and in such ratios so that the resulting amide is compatible with water and forms a stable water dispersion when mixed with an epoxy resin.

Compounds containing carboxyl groups, i.e., carboxylic acids, esters, anhydrides or mixtures are suitable in this invention. Preferred acids are high molecular weight hydrocarbon acids having from 18–54 carbon atoms with 2-3 carboxyl groups. Suitable polycarboxylic acids are dimer and trimer acids produced commercially by polymerization of unsaturated $C_{18}$ fatty acids such as those manufactured by Emery Industries and Arizona Chemical Company.

The polyoxyalkylenepolyamines useful in my invention are those which have been modified to form an aminopropyl derivative of a polyoxyalkylenepolyamine. Compounds of the following general types have been found to be useful as the aminopropyl derivatives of polyoxyalkylenepolyamines in my invention:

$H_2NCH_2CH_2CH_2NHCH(CH_3)CH_2[OCH_2CH(CH_3)]_x NHCH_2CH_2CH_2NH_2$ x=about 2 to 6.

These products are generally referred to as bis(proplyamines) of polyoxypropylenepolyamines. The reaction of the carboxylic acids and the polyoxyalkylenepolyamine may be carried out under the following conditions, for example :

The temperature is increased to about 160°–175° C. and water begins to distill overhead. The temperature is maintained at 175°–220° C. until about 90% of the water is collected and then is raised to maximum of 250°–265° C. during the final stages of reaction. The final temperature may be raised to about 320° C. if desired.

The carboxylic acid or derivatives and the aminopropyl derivative of a polyoxyalkylenepolyamine are reacted in ratios such that the resulting amide is compatible with water. As the data which follows shows certain polyamides are compatible with water whereas others are not.

One skilled in the art will be able to determine the proper ratios. As the data shows (Examples III & IV) a 1.1/1.0 molar ratio of amine to acid is not satisfactory but a 2/1 ratio is. As guidelines for practicing the invention it is recommended that ratios of amine to acid of from about 1.8 to 4/1 be used.

The epoxy resin used herein can be any of the well known epoxy resins having more than one, and preferably an average of more than 1.8 reactive 1,2-epoxy groups for example, the polyglycidyl ether of polyhydric phenol. As is well known in the art, these resins may be prepared by condensing epichlorohydrin with a polyhydric alcohol or phenol, for example, ethylene glycol, diethylene glycol, glycerol, diglycerol, catechol, resorcinol, a trihydroxybenzene, a di(hydroxyphenyl) methane, a di(hydroxyphenyl) ethane, a di(hydroxyphenyl) propane, etc. A preferred epoxy resin is derived from condensing epichlorohydrin with 2,2-bis (p-hydroxyphenyl) propane, known generally as bisphenol-A, and having an epoxide equivalent weight of from 175 to 195.

Thus, the invention involves three basic components:
(A) epoxy resin
(B) a carboxylic acid or derivatives as defined above
(C) aminopropyl derivative of a polyoxyalkylene polyamine.

Components B and C are combined in proper ratios to form a water compatible polyamide. The ratios of components B and C will vary depending upon the nature of each component and one skilled in the art can determine optimum ratios of the components. The polyamide thus formed and water are mixed to form a compatible solution. Epoxy resin (component A) is added and the mixture is stirred until homogeneous. At this point, a water soluble solvent such as isopropanol may be added to adjust the viscosity of the mixture. The mixture is then brushed onto a surface and allowed to cure and form a film.

For curing epoxy resins, the curing agent is usually added in such an amount that there is one reactive NH group in the curing component for each epoxy group in the epoxy resin component. These are known as stoichiometric quantities. The stoichiometric quantity can be calculated from the knowledge of the chemical structure and analytical data on the component.

For the purposes of this invention, the stoichiometric amount of accelerated hardeners calculated by adding together the number of equivalents (on the basis of weight percent replaceable NH groups). In general, it is advantageous to use up to 10% excess of the curing agent over the stoichiometric amount.

The curing temperature range acceptable in this invention are from about 0° to 60° C. Post cures of temperatures up to about 200° C. are optional.

The following examples illustrate the usefulness of the disclosed invention but are not intended to limit the scope thereof.

EXAMPLE I

JEFFAMINE ®D-230[1] bis(propylamine) (486g) was reacted with a $C_{36}$ condensed fatty acid (Empol 1010 dimer acid; Emery) (214g) to a maximum temperature of 260°–265° C. for several hours. (Mole ratio: amine/acid=about 3/1).

| | |
|---|---|
| Total acetylatables, meq/g | 5.18 |
| Total amine, meq/g | 5.00 |
| Primary amine, meq/g | 2.48 |
| 2° + 3° amine, meq/g | 2.52 |
| Brook. visc., cps., 25° C. | 6700 |
| Gardner color | 10–11 (off hue) |

Water compatability, C = compatible; I = incompatible

| wt. ratio: amide/water = | 50/50 C | 40/60 C | 30/70 C[2] | 20/80 I[2] | 10/10 I[3] | 5/95 I[3] |
|---|---|---|---|---|---|---|
| Brook. visc., cps, RT | 6400 | 6200 | 3800 | — | — | — |

[1]JEFFAMINE ®D-230 is a polyoxypropylenepolyamine of about 230 MW
[2]Slight haze
[3]Incompatibility developed after standing for several days.

EXAMPLE II

In the following example, the polyamide of Example I and water was mixed to form a compatible solution. Epoxy resin was added–hand stirred until homogeneous. Isopropanol was added to thin the mixture. The mixture was brushed onto a metal surface and gave the following film properties:

| Formulation: | |
|---|---|
| Liquid epoxy resin (EEW 190) | 100 parts |
| Polyamide | 70 parts |
| Water | 170 parts |
| Isopropanol | 10 parts |
| Brook. viscosity, cps, RT | 3400[1] |
| Drying time, 6-mil film | |
|   Set-to-touch, hours | 7.0 |
|   Thru-dry, hours | 8.8 |
| Reverse impact, in-lbs to fail | |
|   Cure: 24 hours, RT | >160[2] |
|   Cure: 24 hours, RT, 1 hr 110° C. | 100–120 |
|   7 days, RT | >160 |
|   14 days, RT | 116 |

[1]Viscosity dropped to 700 cps after 10 mins., to 300 cps after 35 mins., No longer homogeneous after 60 mins.--areas of separation
[2]Sl. tackiness which disappeared after 48 hours at RT.

EXAMPLE III

The following polyamine and derivatives were reacted with the dimer acid of Example I and were tested for water compatibility.

| Dimer Acid and-- | Ref. | Mole Ratio Amine/Acid | Water Compatibility |
|---|---|---|---|
| JEFFAMINE ® D-400* | 5012-40 | 3/1 | Incompatible |
| Triethylenetetramine | 5012-52 | 3/1 | Gel |
| JEFFAMINE ® T-403 tris (propylamine) | 5012-32 | 3/1 | Incompatible |
| JEFFAMINE ® D-400 bis (propylamine) | 5012-31 | 3/1 | Compatible |
| JEFFAMINE ® D-230 bis (propylamine) | 5012-47 | 2/1 | Compatible |
| JEFFAMINE ® D-230 bis (propylamine) | 5012-49 | 1.1/1 | Incompatible |
| Aminoethylpiperazine | 5012-26 | 2/1 | Incompatible |

Polyamides incompatible with water, of course, were not useful for development of water reducible epoxy systems.

*JEFFAMINES are polyoxypropylenepolyamines with approximate molecular weights corresponding to the number following. Products of Jefferson Chemical Co., Inc.

EXAMPLE IV

The preceding example has shown that a polyamide prepared from JEFFAMINE ®D-230 and dimer acid (molar ratio 1.1/1.0) was incompatible with water and thus not satisfactory for use in a water reducible system. To further show that mixtures of the 1.1/1.0 molar ratio polyamide above and an aminopropyl derivative of JEFFAMINE ®D-230 would likewise be unsatisfactory, the following experiment was performed:

| Formulation: | 5069-45A | 5069-45B | 5069-46-A | 5069-46B |
|---|---|---|---|---|
| Epoxy resin (EEW 185) | 100 | 100 | 100 | 100 |
| JEFFAMINE ® D-230 bis(propylamine) | — | 25.5 | 28 | 30.1 |
| Polyamide | 140 | 25.5 | 10 | 3.4 |
| Water | 200 | 200 | 200 | 200 |
| Isopropanol | 10 | 10 | 10 | 10 |
| Appearance of coating | 1 | 1 | 1 | 1 |

[1]System was incompatible; a coating could not be prepared

I claim:

1. An epoxy resin composition being the cured product of a curable admixture which comprises:
   an epoxy resin comprising a condensation product of epichlorohydrin with 2,2-bis(p-hydroxyphenyl) propane,
   a curing amount of a reactive water compatible polyamide prepared from multifunctional carboxylic acids, esters, anhydrides or mixtures and an aminopropyl derivative of a polyoxyalkylenepolyamine and
   an aqueous medium.

2. The composition of claim 1 wherein the carboxylic acid, ester or anhydride has from 18 to 54 carbon atoms and from 2 to 3 carboxyl groups.

3. The composition of claim 1 wherein the polyoxyalkylenepolyamine is a polyoxypropylenepolyamine.

4. The composition of claim 3 wherein the aminopropyl derivative of the polyoxypropylenepolyamine has the following general structure:

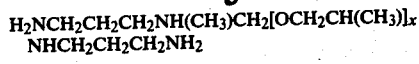

wherein x is from about 2 to 6.

5. The composition of claim 1 wherein the mole ratio of the carboxylic acid, esters or anhydrides to the aminopropyl derivative of the polyoxyalkylenepolyamine is from about 1 to 1.8 to about 1 to 4.

6. An epoxy resin composition being the cured product of a curable admixture which comprises:
  an epoxy resin comprising a condensation product of epichlorohydrin with 2,2-bis(polyhydroxyphenyl)propane,
  a curing amount of a reactive water compatible polyamide prepared from multifunctional carboxylic acids and an aminopropyl derivative of a polyoxypropylenepolyamine and
  an aqueous medium.

7. The composition of claim 6 wherein the carboxylic acid has from 18 to 54 carbon atoms and from 2 to 3 carboxyl groups.

8. The composition of claim 6 wherein the aminopropyl derivative of the polyoxypropylenepolyamine has the following general structure:

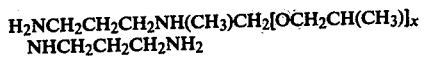

wherein x is from about 2 to 6.

* * * * *